United States Patent Office 3,202,721
Patented Aug. 24, 1965

3,202,721
CHLORINATION OF ISOPRENE
Keith M. Taylor, Dickinson, Tex., assignor to Monsanto Company, a corporation of Delaware
No Drawing. Filed Jan. 2, 1963, Ser. No. 248,868
2 Claims. (Cl. 260—655)

The present invention relates to the chlorination of isoprene. More particularly, it relates to the preparation of 2-chloromethyl-1,3-butadiene by the direct vapor-phase chlorination of isoprene.

Methyl-substituted dienes such as isoprene are readily chlorinated both by substitution and addition. In practically all the known methods, however, chlorination occurs on the carbon atoms of the diene chain and not on the methyl substituent attached to the chain. It has now been determined that chlorination of isoprene to obtain 2-chloromethyl-1,3-butadiene in good yield can be effected directly in the vapor phase by conducting the reaction under a precise set of conditions. The resulting product is a monomer which is highly useful in the production of polymers having active chlorine atoms through which the polymers can be readily cured. The reactivity of the chlorine in the parent monomer also makes it possible to react it with other chemicals to yield additional monomers suitable for production of different polymers and copolymers useful in many and varied applications.

According to the invention, 2-chloromethyl-1,3-butadiene is obtained by chlorinating isoprene at temperatures in the range from about 350° to about 750° C. at reaction times in the range from about 2.5 to about 100 milliseconds using reactant ratios of isoprene to chlorine within the range from 3:1 to 1:3. Preferably, an inert gas is admixed with the reactive gases to function as a diluent to absorb the heat and moderate the reaction.

The invention is illustrated in the following example which, however, is not to be construed as limiting it in any manner whatsoever.

EXAMPLE

A series of runs was made in which isoprene was reacted in the vapor phase directly with chlorine. The reactor employed was an 0.8 cm. O.D. quartz tube of the length required to give the desired reaction time. Heat was supplied to a section of the tube by means of a wrapping of nichrome wire with the voltage to the heating wire being controlled by a Variac. Reaction zone temperature was determined with a thermocouple in a 3 mm. O.D. quartz tube centered in the reactor. Isoprene was premixed with from approximately 50 to 75% by volume of diluent nitrogen and passed together with an amount of chlorine to give the desired mole proportions through the heated reactor at a rate to provide the desired average residence time in the reaction zone. The effluent gases from the reactor were passed consecutively through a water scrubber to remove HCl and a series of Dry Ice traps. Noncondensed gases were vented to the atmosphere. The condensed products were combined, weighed, and then analyzed by means of a gas chromatograph. Conversions of isoprene and the mole percent yield of the principal product, 2-chloromethyl-1,3-butadiene, are tabulated together with the conditions under which they were obtained in Table I below.

Table I

| Isoprene | Chlorine | Diluent $N_2$ (vol. percent) | Temp., °C. | Reaction times (milliseconds) | Conv. of Isoprene | Yield, 2-chloromethyl-1,3-butadiene (mole percent) |
|---|---|---|---|---|---|---|
| 1 | 1 | 50 | 400 | 5 | 98.5 | 30.6 |
| 1 | 1 | 50 | 400 | 10 | 86.2 | 24.7 |
| 1 | 1 | 50 | 500 | 2.5 | 94.1 | 32.4 |
| 1 | 1 | 50 | 500 | 5 | 98.0 | 32.4 |
| 1 | 1 | 50 | 500 | 10 | 83.8 | 32.2 |
| 1 | 1 | 50 | 600 | 2.5 | 94.9 | 35.1 |
| 1 | 1 | 50 | 600 | 5 | 98.8 | 45.6 |
| 1 | 1 | 50 | 600 | 10 | 86.5 | 43.3 |
| 1 | 1 | 50 | 650 | 2.5 | 77.6 | 35.0 |
| 1 | 1 | 75 | 650 | 5 | 58.1 | 50.9 |
| 1 | 1.5 | 75 | 650 | 5 | 66.2 | 57.0 |
| 1 | 2 | 75 | 650 | 5 | 96.5 | 52.4 |
| 1 | 2 | 75 | 650 | 10 | 88.6 | 51.4 |
| 1 | 1 | 75 | 650 | 10 | 69.4 | 49.6 |
| 1.6 | 1 | 75 | 650 | 8.6 | 47.8 | 60 |
| 1 | 2 | 75 | 700 | 2.5 | 95.2 | 30.9 |
| 1 | 1 | 75 | 700 | 5 | 60.8 | 55.9 |
| 1 | 2 | 75 | 700 | 5 | 96.3 | 50.0 |
| 1 | 1 | 75 | 700 | 10 | 70.1 | 54.6 |
| 1 | 2 | 75 | 700 | 10 | 87.9 | 50.3 |
| 1.6 | 1 | 75 | 700 | 8.6 | 62.0 | 56.4 |
| 1.4 | 1 | 75 | 700 | 8.6 | 67.4 | 57.1 |
| 1 | 2 | 75 | 750 | 2.5 | 87.5 | 37.7 |
| 1 | 1 | 75 | 750 | 5 | 61.5 | 58.7 |
| 1 | 2 | 75 | 750 | 10 | 94.5 | 51.6 |

It is apparent from the foregoing data that under properly controlled conditions, excellent yields of 2-chloromethyl-1,3-butadiene can be obtained by the direct chlorination of isoprene with chlorine. These yield advantages are attributable for the most part to the high temperatures and the ultra-short residence times used. Such extremely short residence times have not heretofore been employed in this chlorination reaction. They make possible a greater through-put of reactants with a given reactor thus facilitating the use of smaller and less expensive equipment to produce equivalent or greater amounts of product.

Conditions varying from those given in the example can be employed without departing from the scope of the invention. For example, the reaction can be conducted at temperatures as low as 350° C., although yields at these temperatures are somewhat lower. The preferred temperatures for the reaction lie in the range from about 600° C. to about 700° C.

Preferred residence times, i.e., the time at which the reactants are maintained in the reaction zone at reaction temperature, are those from about 5 to about 10 milliseconds. However, residence times varying from about 2.5 to about 100 milliseconds can be used.

The mole ratio of isoprene to chlorine employed is not too significant with respect to the course of the reaction, although this variable has some effect on the conversion of isoprene. Preferred isoprene-to-chlorine ratios are those in the range from 1:1.6 to 1.6:1. In general, isoprene-to-chlorine ratios of 1:3 to 3:1 can be employed.

An inert diluent is not required but can be employed effectively to moderate and control the reaction. The particular inert diluent employed does not materially affect the yield of products obtained. Suitable diluent gases which can be used in addition to nitrogen include helium, carbon dioxide, argon, hydrogen chloride, and the like. In fact, large excesses of isoprene can be employed as a diluent with the excess unreacted isoprene being recycled in the process.

The 2-chloromethyl-1,3-butadiene can be separated and recovered from the other chlorinated products of the reaction such as 1-chloro-3-methylbutene-1, 1-chloro-2-methylbutadiene, 1,4-dichloro-3-methylbutene-1, 2,4-dichloro-3-methylbutene-1, and the like by conventional factional distillation techniques.

What is claimed is:

1. A process for the production of 2-chloromethyl-1,3-butadiene which comprises reacting isoprene and chlorine in mole proportions of from about 1:3 to 3:1 in a reaction zone heated to a temperature in the range from about 350° C. to about 750° C., the residence time of the reaction gas mixture in the reaction zone being maintained within the range from about 2.5 to about 100 milliseconds.

2. A process for the protutcion of 2-chloromethyl-1,3-butadiene which comprises reacting isoprene and chlorine in mole proportions of from about 1:1.6 to 1.6:1 in a reaction zone heated to a temperature in the range from about 600° C. to about 700° C., the residence time of the reaction gas mixture in the reaction zone being maintained within the range from about 5 to about 10 milliseconds.

References Cited by the Examiner
UNITED STATES PATENTS

| 2,130,084 | 9/38 | Groll et al. | 260—654 |
| 2,281,096 | 4/42 | Eugs et al. | 260—655 |
| 2,299,477 | 10/42 | Hearne et al. | 260—654 |
| 2,350,373 | 6/44 | Soday | 260—652 |
| 2,937,125 | 5/60 | Berenbaum | 260—655 XR |

OTHER REFERENCES

Morrison et al., Organic Chemistry, (1959).

LEON ZITVER, *Primary Examiner.*